(12) United States Patent
Lamprakes

(10) Patent No.: US 11,226,500 B2
(45) Date of Patent: Jan. 18, 2022

(54) EYEWEAR LOCATION APPARATUS

(71) Applicant: Catherine Lamprakes, Rockaway Beach, OR (US)

(72) Inventor: Catherine Lamprakes, Rockaway Beach, OR (US)

(*) Notice: Subject to any disclaimer, the term of this patent is extended or adjusted under 35 U.S.C. 154(b) by 0 days.

(21) Appl. No.: 16/298,222

(22) Filed: Mar. 11, 2019

(65) Prior Publication Data

US 2019/0391414 A1 Dec. 26, 2019

Related U.S. Application Data

(60) Provisional application No. 62/689,321, filed on Jun. 25, 2018.

(51) Int. Cl.

| | | |
|---|---|---|
| *G02C 11/00* | (2006.01) | |
| *G02C 11/04* | (2006.01) | |
| *H04R 1/02* | (2006.01) | |
| *G08B 7/06* | (2006.01) | |
| *G01S 19/13* | (2010.01) | |
| *H05B 45/20* | (2020.01) | |
| *H05B 47/19* | (2020.01) | |

(52) U.S. Cl.
CPC .............. *G02C 11/10* (2013.01); *G01S 19/13* (2013.01); *G02C 11/04* (2013.01); *G08B 7/06* (2013.01); *H04R 1/028* (2013.01); *H05B 45/20* (2020.01); *H05B 47/19* (2020.01); *G02C 2200/02* (2013.01)

(58) Field of Classification Search
CPC .... G02C 11/10; G02C 11/04; G02C 2200/02; H05B 45/20; H05B 47/19; H04R 1/028; G08B 7/06; G08B 21/24; G08B 3/10; G01S 19/13; G01S 19/14; G01S 5/0027
See application file for complete search history.

(56) References Cited

U.S. PATENT DOCUMENTS

| | | | | |
|---|---|---|---|---|
| 2,482,195 A | * | 9/1949 | Martin | G02C 11/02 |
| | | | | 351/52 |
| 5,537,765 A | * | 7/1996 | Liebman | G02C 11/00 |
| | | | | 40/664 |
| 9,690,121 B2 | * | 6/2017 | Howell | H02J 7/00 |
| 9,910,298 B1 | * | 3/2018 | Sales | G02C 11/04 |
| 2005/0195606 A1 | * | 9/2005 | Henoch | A45C 15/06 |
| | | | | 362/277 |
| 2011/0037585 A1 | * | 2/2011 | Wang | B60R 25/1004 |
| | | | | 340/539.1 |
| 2016/0240067 A1 | * | 8/2016 | London | G08B 13/1427 |

* cited by examiner

*Primary Examiner* — Darryl J Collins
*Assistant Examiner* — Matthew Y Lee
(74) *Attorney, Agent, or Firm* — Boudwin Intellectual Property; Daniel Boudwin

(57) ABSTRACT

An eyewear location apparatus. The eyewear location apparatus includes a first strip and a second strip. The first strip and the second strip are designed to be attached to temples of eyewear, such as eyeglasses. The first strip includes a light emitting diode that is actuatable via an actuator. The second strip includes a speaker and a GPS transponder that are each actuatable via a pair of actuators. Actuation of the light emitting diode, the speaker and the GPS transponder is designed to as a user in locating an eyewear device.

16 Claims, 3 Drawing Sheets

EYEWEAR LOCATION APPARATUS

CROSS REFERENCE TO RELATED APPLICATIONS

This application claims the benefit of U.S. Provisional Application No. 62/689,321 filed on Jun. 25, 2018. The above identified patent application is herein incorporated by reference in its entirety to provide continuity of disclosure.

BACKGROUND OF THE INVENTION

The present invention relates to an eyewear location apparatus. More specifically, the present invention involves a pair of strips configured to secure to the temples of an eyewear device to assist the owner of the eyewear device in locating the eyewear device.

Many people, of all ages, use eyewear for various reasons. For example, individuals may wear corrective eyeglasses to overcome deficiencies in their vision. Additionally, individuals may wear sunglasses on a sunny day to prevent excessive amounts of sunlight from reaching his or her eyes. Furthermore, many workers, such as construction workers or chemical workers, may be required to wear protective eyewear as a condition of their employment.

A drawback to eyewear is that it is prone to being misplaced or lost. Regardless of how well-kept a location, such as a home or office, may be, eyewear may become difficult to locate once it is placed down. Specifically, children may remove their eyewear and lose track of the location where they placed their eyewear. Additionally, elderly individuals may struggle to remember where they have placed their eyewear. Searching for eyewear can be a frustrating and time-consuming task. Notably, individuals who wear corrective eyewear may struggle excessively as diminished vision makes finding eyewear even more difficult.

Currently available methods and apparatuses that seek to solve this problem contain numerous deficiencies that many individuals may not be able to overcome. Eyewear holders may assist a user while removing eyewear for when an individual must remove his or her eyewear for a short amount of time, however, these eyewear holders must be removed in several everyday situations, such as for sleeping or showering. Furthermore, many individuals may place their eyewear into a memorable storage location, such as a case in a purse or backpack or in a pocket. However, these locations, even if easy to remember, can expose eyewear to damage if not properly secured.

Therefore, there is a need amongst currently developed solutions to misplaced eyewear that provides additional benefits to an individual while minimizing the deficiencies of the alternative methods. The improved apparatus must provide convenience to a user when locating misplaced eyewear by providing more than one process for locating eyewear. Furthermore, the improved apparatus should be easily attachable and removable from the eyewear to provide convenience to the individual.

SUMMARY OF THE INVENTION

In view of the foregoing disadvantages inherent in the known types of eyewear location apparatuses now present in the known art, the present invention provides an eyewear location apparatus wherein the same can be utilized for providing convenience for the user when locating an eyewear device that has been lost or misplaced.

The present system comprises a first strip and a second strip. Each of the first strip and the second strip has a first surface and a second surface. The first surface of the first strip and the first surface of the second strip has a fastener. The second surface of the first strip has at least one light-emitting diode thereon. The light-emitting diode is operably connected to a light-emitting diode controller. The second surface of the second strip has a speaker and a GPS transponder disposed thereon. The speaker is operably connected to a speaker controller and the GPS transponder is operably connected to a GPS transponder controller. The light-emitting diode, the light-emitting diode controller, the speaker, the speaker controller, the GPS transponder, and the GPS transponder are operably connected to a power source.

A remote control is in operable connection with the light-emitting diode controller, the speaker controller and the GPS transponder controller. The remote control has a first actuator, a second actuator and a third actuator. The first actuator is operably connected to the light-emitting diode controller. The second actuator is operably connected to the speaker controller. The third actuator is operably connected to the GPS transponder controller.

In another embodiment, the fastener is a magnetic fastener, such that the first strip and the second strip are freely removable from the eyewear device to provide convenience to the user.

In a further embodiment, the first strip and the second strip are each integrated upon a first temple and a second temple, respectively, such as to provide comfort to the user.

In yet another embodiment, the power source is operably connected to a charging port, such as a mini-USB or a standard USB, so that the power source can easily and conveniently be recharged by the user.

In yet a further embodiment, the light-emitting diode controller is programmed to change a color that is displayed by the light-emitting diode, so that the user may change or customize the color that is displayed by the light-emitting diode.

In another embodiment, the first strip and the second strip incorporate their respective components such that they are configured to be water-resistant, such that if the eyewear device is exposed to water, operation of the eyewear location apparatus will be preserved.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
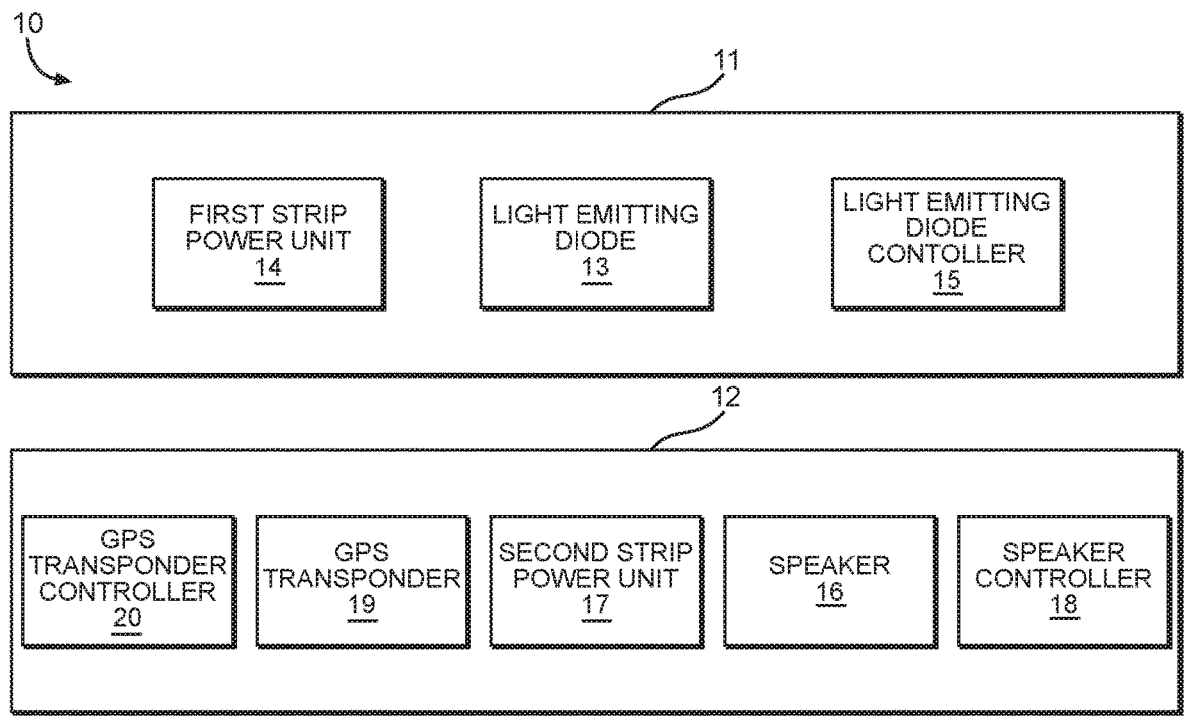
FIG. 1 shows a block diagram of an embodiment of the eyewear location apparatus.

Reference is made herein to the attached drawings. Like reference numerals are used throughout the drawings to depict like or similar elements of the eyewear location apparatus. The figures are intended for representative purposes only and should not be considered to be limiting in any respect.

Referring now to FIG. 1, there is shown a block diagram of an embodiment of the eyewear location apparatus. The eyewear location apparatus 10 comprises a first strip 11 and a second strip 12. The first strip 11 and the second strip 12 correspond to a pair of temples of an eyewear device, such that they are securable thereon. In one embodiment, the first strip 11 and the second strip 12 each define housings configured to store a plurality of components therein. In a further embodiment, the first strip 11 and the second strip 12 define housings that are sealed to be water-resistant, such that the components stored therein will be protected from water damage.

The first strip 11 comprises at least one light emitting diode (LED) 13. The at least one light emitting diode 13 is in operable connection with a first strip power unit 14. Furthermore, the at least one light emitting diode 13 is in operable connection with a light emitting diode controller 15. The light emitting diode 13 is configured to act as a visual identifier for an individual who is utilizing the eyewear location apparatus 10. The light emitting diode 13 may be configured to be actuated in a constant light or may be actuatable in a patterned active and inactive frequency, such that the light emitting diode 13 will be more noticeable to a user.

In an alternate embodiment, the light emitting diode controller 15 is programmed to enable a user to change a color displayed by the light emitting diode 13. A user may desire to change the color displayed by the light emitting diode 13 in response to a light environment surrounding the light emitting diode. For example, if a user is attempting to locate eyewear equipped with the eyewear location apparatus 10 in a room that features red lighting, the user will more easily locate the eyewear location apparatus 10 if the color displayed by the light emitting diode 13 is a color that is not red.

In one embodiment, the first strip power unit 14 is in operable connection with a charging port. The charging port is any suitable charging port configured to receive a charge therein, such that power can be stored in the first strip power unit 14 from a power source. For example, the charging port may be a mini-USB input charging port or a standard USB input charging port.

The second strip 12 comprises a speaker 16 thereon. The speaker 16 is in operable connection with a second strip power unit 17. Furthermore, the speaker 16 is in operable connection with a speaker controller 18. The speaker 16 is configured to play a noise when actuated. The noise is any audio recording stored on the speaker controller 18. For example, the noise may be a "beep" noise or a prerecorded human voice. The speaker 16 is configured to provide an auditory indicator for an individual utilizing the eyewear location apparatus 10.

Furthermore, the second strip 12 comprises a GPS transponder 19 thereon. The GPS transponder 19 is in operable connection with the second strip power unit 17. Additionally, the GPS transponder 19 is operable connection with a GPS transponder controller 20. The GPS transponder 19 is configured to provide a locational indicator for an individual utilizing the eyewear location apparatus 10. The GPS transponder 19 is configured to pair to a device equipped with a GPS receiver, such that the GPS transponder 19 will transmit the location of the eyewear location apparatus 10 to the device equipped with the GPS receiver. For example, the GPS transponder 19 may transmit the location of the eyewear location apparatus 10 to a mobile phone of a user.

In one embodiment, the second strip power unit 17 is in operable connection with a charging port. The charging port is any suitable charging port configured to receive a charge therein, such that power can be stored in the second strip power unit 17 from a power source. For example, the charging port may be a mini-USB input charging port or a standard USB input charging port.

In one embodiment, a wire extends from the power source of the first strip 11 to the power source of the second strip 12, such that both the first strip 11 and the second strip 12 may be recharged simultaneously. Additionally, it is contemplated that the first strip 11 and the second strip 12 can be charged via a charging dock. In such an embodiment, the first strip 11 and the second strip 12 would comprise a charging mechanism configured to attach to the dock. As such, the first strip 11 and the second strip 12 could be charged via a single charging dock.

Figure 2:
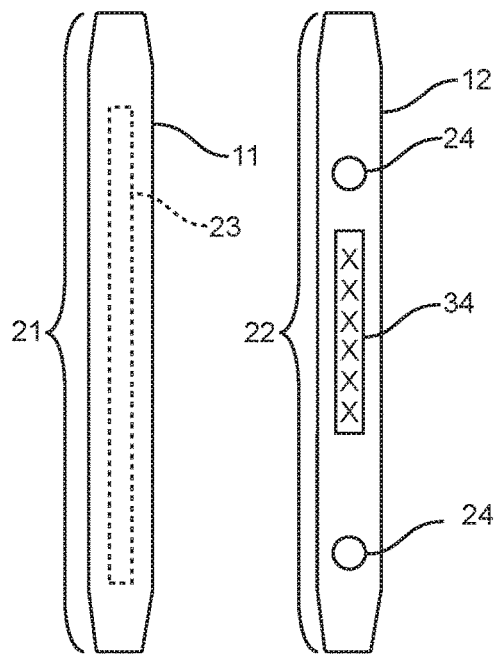
FIG. 2 shows a rear view of an embodiment of the eyewear location apparatus.

Referring now to FIG. 2, there is shown a rear view of an embodiment of the eyewear location apparatus. A first surface 21 of the first strip 11 and a first surface 22 of the second strip 12 have a fastener 23, 24 thereon. The fastener 23, 24 is any fastener capable of securing the first strip 11 and the second strip 12 to the target surface, such as a temple of an eyewear device. For example, the fastener 23, 24 may be an adhesive or a snap clasp in conjunction with the temple of the eyewear device. In one embodiment, the fastener 23, 24 is a magnetic fastener, such that the first strip 11 and the second strip 12 may be magnetically secured to a metal temple of a pair of eyeglasses.

In one embodiment, the fastener 23 is a singular body configured to secure the entire strip 11 to a targeted surface. This configuration is desirable for a user where the fastener 23 is an adhesive, such as a glue, to ensure that the strip 11 is applied evenly to a temple of an eyewear device to prevent discomfort from uneven application of the fastener 23. In another embodiment, the fastener 24 comprises a plurality of fasteners 24 configured to work in conjunction in securing the strip 12 to the targeted surface. This configuration is desirable for a user.

In an alternate embodiment, the eyewear location apparatus comprises an indicium 34 thereon. The indicium 34 comprises a unique identifier, such as an alphanumeric code. Utilizing a unique identifier as the indicium 34 provides convenience to a user where the user needs to prove ownership of the eyewear device equipped with the eyewear location apparatus. For example, if the owner of the eyewear location apparatus needs to describe the eyewear device which is integrated with the eyewear location apparatus to another individual, the unique identifier may be utilized to more specifically describe the eyewear device.

Figure 3:
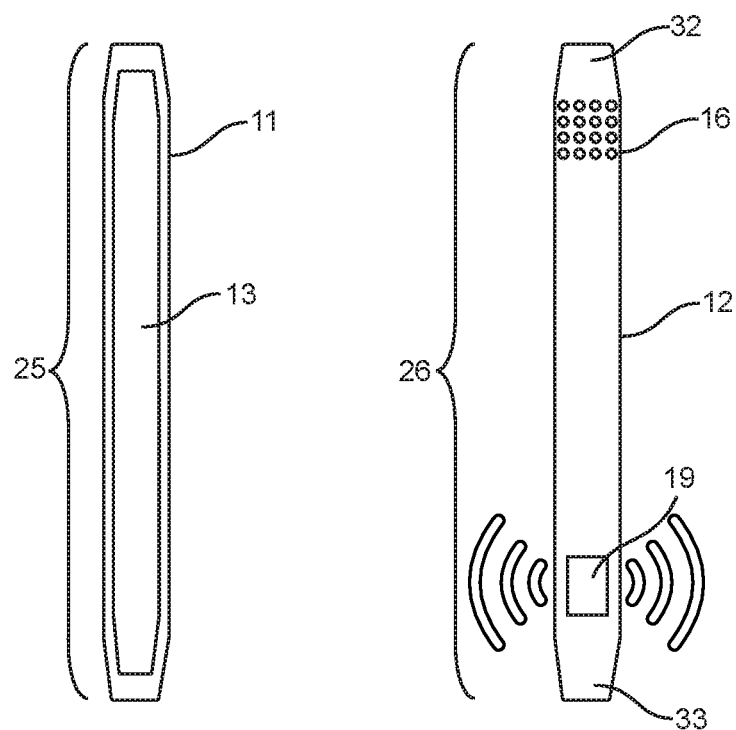
FIG. 3 shows a front view of an embodiment of the eyewear location apparatus.

Referring now to FIG. 3, there is shown a front view of an embodiment of the eyewear location apparatus. A second surface 25 of the first strip 11 has the at least one light-emitting diode 13 thereon. In the illustrated embodiment, the light emitting diode 13 substantially covers the area of the second surface 25 of the first strip 11. In another embodiment, the light emitting diode 13 covers the entire area of the second surface 25 of the first strip. Maximization of the coverage area of the second surface 25 of the strip enables easier identification of the light emitting diode 13 because it will be larger and easier to notice by the user.

A second surface 26 of the second strip 12 has the speaker 16 and the GPS transponder 19 thereon. The speaker 16 is disposed on an end 32 of the second surface 26 of the second strip 12. Additionally, in the shown embodiment, the GPS transponder 19 disposed on an opposing end 33 of second surface 26 of the second strip relative to the speaker 16. When the speaker 16 and the GPS transponder 19 are disposed on opposing ends of the second strip 16, the risk of both the speaker 16 and the GPS transponder 19 being simultaneously damaged or rendered inoperable is reduced. If the speaker 16 and the GPS transponder 19 were simultaneously rendered inoperable, location of an eyewear device equipped with the eyewear location apparatus would be more difficult.

Figure 4:
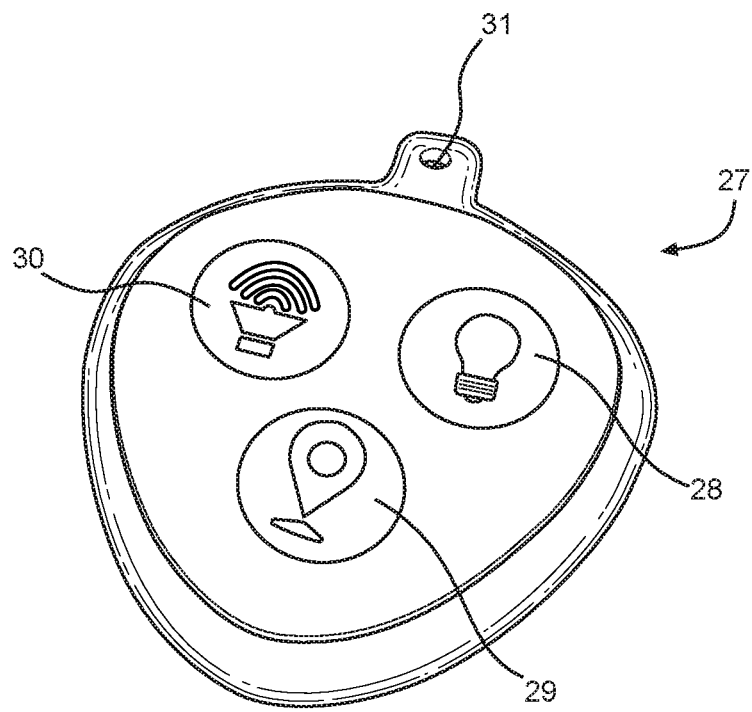
FIG. 4 shows a perspective view of a remote control of an embodiment of the eyewear location apparatus.

Referring now to FIG. 4, there is shown a perspective view of a remote control of an embodiment of the eyewear location apparatus. A remote control 27 is in operable connection with each of the light-emitting diode controller, the speaker controller and the GPS transponder controller. As such, the remote control 27 comprises a first actuator 28, a second actuator 29 and a third actuator 30. Because each of the light emitting diode controller, the speaker controller and the GPS transponder controller is in operable connection with an individual actuator, each of the foregoing controllers is individually actuatable as well as being simultaneously actuatable.

The first actuator 28 is configured to actuate the light-emitting diode controller. The first actuator 28 contains an indicium configured to identify the first actuator 28 as the actuator in operable connection with the light emitting diode controller. In the illustrated embodiment, the indicium comprises a light bulb symbol. In one embodiment, actuation of the first actuator 28 results in the light emitting diode being lit in a constant stream, while pressing the first actuator 28 a second time results in deactivation of the light emitting diode. In another embodiment, the first actuator 28 is configured to activate the light emitting diode as the first actuator 28 is held in an active position by the user.

The second actuator 29 is configured to actuate the GPS transponder controller. The second actuator 29 contains an indicium configured to identify the second actuator 29 as the actuator that is in operable connection with the GPS transponder controller. In the illustrated embodiment, the indicium is a map marker symbol.

The third actuator 30 is configured to actuate the speaker controller. The third actuator 30 contains an indicium configured to identify the third actuator as the actuator that is in operable connection with the speaker controller. In the illustrated embodiment, the indicium is an audio symbol.

In the illustrated embodiment, the remote control 27 further comprises a protrusion 31. The protrusion 31 comprises an aperture therethrough. The aperture is dimensioned to attach to a key ring, such that the remote control 27 can be stored using a key ring. By attaching the remote control 27 to a key ring, the risk of misplacing or losing the remote control 27 is thereby reduced.

Figure 5:
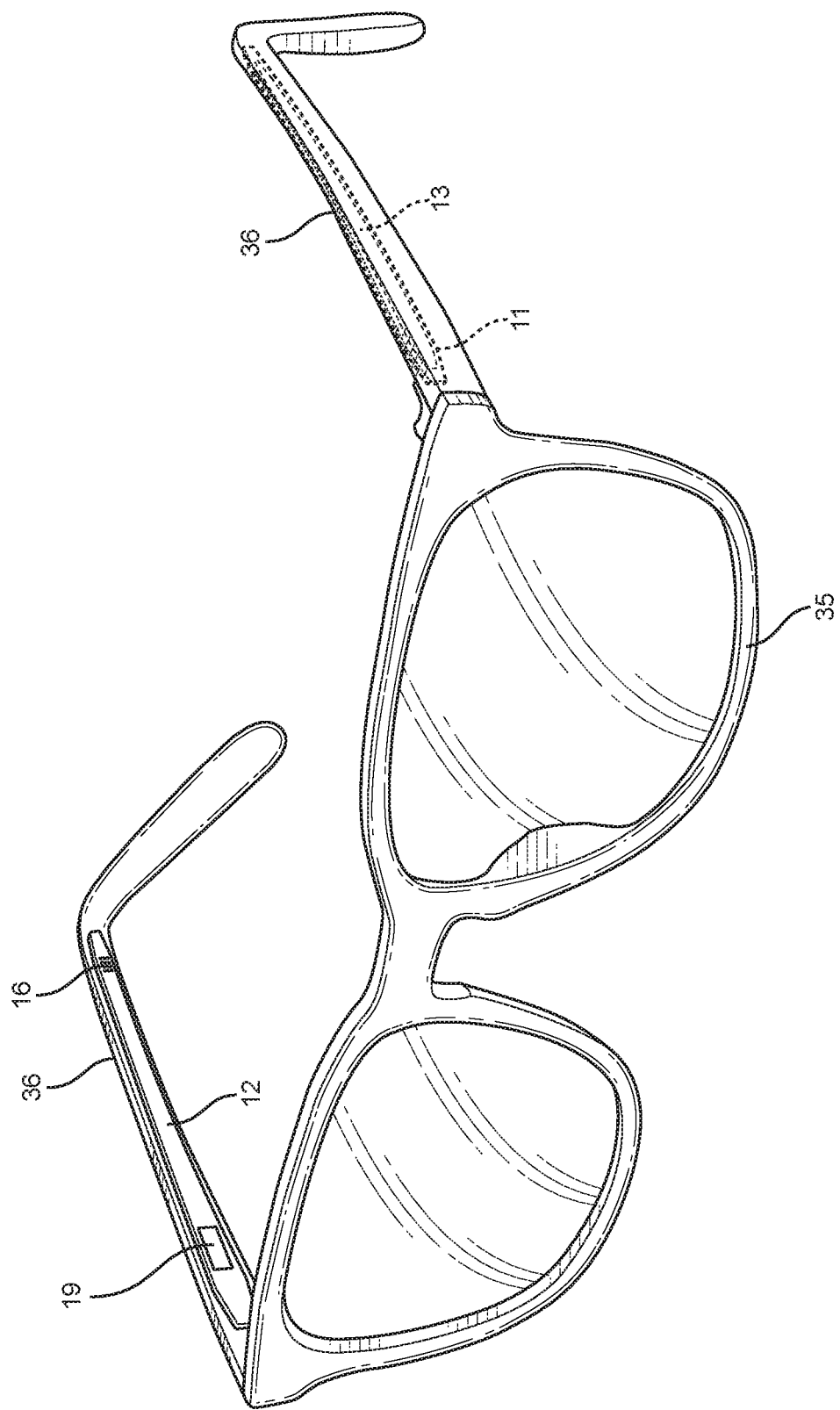
FIG. 5 shows a perspective view of an embodiment of the eyewear location apparatus in use.

Referring now to FIG. 5, there is shown a perspective view of an embodiment of the eyewear location apparatus in use. In use, the first strip 11 is attached to a temple 36 of an eyewear device 35. The second strip 12 is attached to a temple 36 of an eyewear device 35. In the illustrated embodiment, the first strip 11 and the second strip 12 are secured to a pair of internal surfaces of the temples 36 of the eyewear device 35, such that the first strip 11 and the second strip 12 are not visible while the eyewear device 35 is being worn.

In an alternate embodiment, each of the first strip 11 and the second strip 12 are structurally integrated upon a pair of temples of a pair of eyeglasses. Structural integration of the first strip 11 and the second strip 12 promotes further integration of the eyewear location apparatus upon the eyewear device 35. Additionally, integration of the first strip 11 and the second strip 12 will provide comfort and ease to a user as the eyewear device 35 will rest more naturally on the head of the user.

In another embodiment, the first strip 11 and the components embedded therein are equal in weight to the second strip and the components therein. In one embodiment, at least one weight is disposed on the first strip 11 or the second strip 12 to render each strip equal to the other in weight. As such, the first strip 11 and the second strip 12 will be perfectly balanced, such as to prevent the eyewear device 35 from becoming uneven as rested upon a pair of ears and a nose of the user.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An eyewear location apparatus, comprising:
    a first strip and a second strip, each having a first surface and a second surface;
    each of the first surface of the first strip and the first surface of the second strip having a fastener thereon;
    each fastener configured to secure the first strip and the second strip to a corresponding surface of a temple of a pair of eyeglasses;
    the second surface of the first strip consisting of a light emitting diode and a light emitting diode controller;
    the light-emitting diode operably connected to a light-emitting diode controller;
    the second surface of the second strip consisting of a speaker connected to a speaker controller and a GPS transponder connected to a GPS transponder controller;
    a remote control in operable connection with each of the light-emitting diode controller, the speaker controller, and the GPS transponder controller;
    the light-emitting diode, the speaker, the GPS transponder, the light-emitting diode controller, the speaker controller, and the GPS transponder controller each in operable communication with a power source;
    the remote control having a plurality of actuators;
    the plurality of actuators consisting of a first actuator, a second actuator, and a third actuator;
    the first actuator configured to actuate the light-emitting diode controller;
    the second actuator configured to actuate the speaker controller; and
    the third actuator configured to actuate the GPS transponder controller.

2. The eyewear location apparatus of claim 1, wherein each fastener is a magnetic fastener.

3. The eyewear location apparatus of claim 1, wherein each of the first strip and the second strip are structurally integrated upon a pair of temples of an eyewear device.

4. The eyewear location apparatus of claim 1, wherein the power source comprises a charging port thereon.

5. The eyewear location apparatus of claim 4, wherein the charging port is a mini-USB input.

6. The eyewear location apparatus of claim 4, wherein the charging port is a standard USB input.

7. The eyewear location apparatus of claim 1, wherein the light-emitting diode controller is programmed to enable a user to change a color displayed by the light-emitting diode.

8. The eyewear location apparatus of claim 1, wherein each of the first strip and the second strip are adapted to be water resistant.

9. The eyewear location apparatus of claim 1, wherein the first strip and the light-emitting diode is equivalent in weight to the second strip, the speaker and the GPS transponder.

10. The eyewear location apparatus of claim 1, wherein a unique identifier is disposed on the eyewear location apparatus.

11. The eyewear location apparatus of claim 10, wherein the unique identifier is disposed on a first surface of the first strip.

12. The eyewear location apparatus of claim 10, wherein the unique identifier is disposed on a first surface of the second strip.

13. The eyewear location apparatus of claim 1, wherein the fastener is an adhesive.

14. The eyewear location apparatus of claim 1, wherein the fastener is a snap clasp.

15. The eyewear location apparatus of claim 1, wherein the first strip and the second strip define an elongated shape characterized by a greater length than height.

16. The eyewear location apparatus of claim 1, wherein each fastener is configured to secure the first strip and the second strip to a corresponding internal surface of a temple of a pair of eyeglasses.

* * * * *